US012478976B2

(12) United States Patent
Pan

(10) Patent No.: US 12,478,976 B2
(45) Date of Patent: Nov. 25, 2025

(54) PAPER HOLDING MECHANISM AND PAPER SHREDDER

(71) Applicant: Michilin Prosperity Co., Ltd., New Taipei (TW)

(72) Inventor: Guofeng Pan, Guangdong (CN)

(73) Assignee: MICHILIN PROSPERITY CO., LTD., New Taipei (TW)

( * ) Notice: Subject to any disclaimer, the term of this patent is extended or adjusted under 35 U.S.C. 154(b) by 280 days.

(21) Appl. No.: 18/139,636

(22) Filed: Apr. 26, 2023

(65) Prior Publication Data

US 2024/0198349 A1 Jun. 20, 2024

(30) Foreign Application Priority Data

Dec. 15, 2022 (CN) ........................ 202211615752.X

(51) Int. Cl.

*B02C 18/00* (2006.01)
*B02C 18/22* (2006.01)
*B25C 11/00* (2006.01)

(52) U.S. Cl.

CPC ...... *B02C 18/0007* (2013.01); *B02C 18/2283* (2013.01); *B02C 18/2291* (2013.01); *B25C 11/00* (2013.01)

(58) Field of Classification Search

CPC ............ B02C 18/0007; B02C 18/2283; B02C 18/2291

See application file for complete search history.

(56) References Cited

U.S. PATENT DOCUMENTS

| | | | | |
|---|---|---|---|---|
| 2005/0274836 A1 | 12/2005 | Chang | | |
| 2006/0249609 A1* | 11/2006 | Huang | B02C 18/0007 | 241/224 |
| 2012/0018554 A1 | 1/2012 | Seo et al. | | |
| 2015/0258549 A1* | 9/2015 | Ahn | B02C 18/0007 | 241/285.3 |

(Continued)

FOREIGN PATENT DOCUMENTS

| | | |
|---|---|---|
| CN | 106179661 A | 12/2016 |
| CN | 106807517 A | 6/2017 |
| CN | 111617859 A | 9/2020 |

(Continued)

OTHER PUBLICATIONS

Office Action dated May 24, 2025; Chinese Patent Application No. 202211615752.X. 15 pages.

(Continued)

*Primary Examiner* — Mohammed S. Alawadi
(74) *Attorney, Agent, or Firm* — McDonald Hopkins LLC

(57) ABSTRACT

Provided are a paper holding mechanism and a paper shredder. In the paper holding mechanism, a placement chamber is disposed in the housing. The placement chamber includes a conveyor section and a placement section that communicate with each other. An included angle is set between the conveyor section and the placement section. The housing is provided with a first paper inlet at the conveyor section. The first paper inlet communicates with the conveyor section. The paper feed assembly is disposed on the housing. The first paper press member is disposed on the housing. The width of the placement section at the first paper press member is variable.

18 Claims, 9 Drawing Sheets

(56) References Cited

U.S. PATENT DOCUMENTS

| | | | |
|---|---|---|---|
| 2022/0118460 | A1 | 4/2022 | Ren et al. |
| 2022/0193689 | A1 | 6/2022 | Herman |

FOREIGN PATENT DOCUMENTS

| | | | |
|---|---|---|---|
| CN | 112169952 | A | 1/2021 |
| CN | 115957875 | A | 4/2023 |
| CN | 220111247 | U | 12/2023 |
| JP | H05317740 | A | 12/1993 |

OTHER PUBLICATIONS

Office Action dated May 23, 2025; Chinese Patent Application No. 202310784670.6. 16 pages.

Office Action dated Jul. 16, 2025; U.S. Appl. No. 18/233,758, filed Aug. 14, 2023. 20 pages.

* cited by examiner

PAPER HOLDING MECHANISM AND PAPER SHREDDER

This application claims priority to Chinese Patent Application No. 202211615752X filed Dec. 15, 2022, the disclosure of which is incorporated herein by reference in its entirety.

TECHNICAL FIELD

The present disclosure relates to the technical field of office supplies, and to, in particular, a paper holding mechanism and a paper shredder.

BACKGROUND

A paper shredder is commonly used office equipment for shredding waste paper documents. The existing automatic paper shredder that can automatically feed paper mainly includes a paper holding mechanism that can hold stacks of paper and convey them sequentially, and a paper shredder core. When the automatic paper shredder is in use, the paper to be shredded is placed in stack in the paper holding mechanism and then sequentially drawn into the shredder core by a conveyor, and then the shredder core shreds the paper to complete the automatic paper feed and shredding operations.

To satisfy the need to provide space for placing the paper to be shredded, the current automatic paper shredder mainly adopts a paper placement platform in the paper shredder housing. In this manner, since a paper placement platform needs to be arranged in the paper shredder housing, the paper shredder body is too large and occupies a too large area, making it difficult for miniaturization. Moreover, when the paper to be shredded is relatively large, placement of paper is difficult, use of the shredder is inconvenient, and production cost is high. In addition, in the paper feed process, staples are easily to be dragged into the shredder core, affecting the service life of the shredder core.

Therefore, there is an urgent need to develop a paper holding mechanism to solve the following problems: the current paper placement platform occupies a large area and easily drags a staple into a paper shredder core, affecting the service life of the paper shredder core.

SUMMARY

The present disclosure provides a paper holding mechanism and a paper shredder to solve the following problems: the current paper placement platform occupies a large area and easily drags a staple into a paper shredder core, affecting the service life of the paper shredder core.

To achieve the preceding object, the present disclosure provides the technical solutions described below.

In one aspect, the present disclosure provides a paper holding mechanism. The paper holding mechanism includes a housing, a paper feed assembly, and a first paper press member.

A placement chamber is disposed in the housing. The placement chamber includes a conveyor section and a placement section that communicate with each other. An included angle is set between the conveyor section and the placement section. The housing is provided with a first paper inlet at the conveyor section. The first paper inlet communicates with the conveyor section.

The paper feed assembly is disposed on the housing.

The first paper press member is disposed on the housing. The width of the placement section at the first paper press is variable.

In an embodiment, the first paper press member is disposed on the housing and is movable between a first position and a second position. The distance between the first paper press member and a first side wall of the placement section facing away from the first paper inlet is L1 when the first paper press member is located at the first position and is L2 when the first paper press member is located at the second position, where L2>L1.

In an embodiment, the first paper press member is plate-shaped. A first end of the first paper press member is rotatably disposed on the housing. A second end of the first paper press member is configured to move towards or away from the first side wall. The minimum distance between the second end of the first paper press member and the first side wall is L1.

In an embodiment, the paper holding mechanism includes a first elastic member disposed between the first paper press member and the housing. The first elastic member is configured to make the second end of the first paper press member move towards the first side wall.

In an embodiment, the paper holding mechanism includes a staple removal member. One end of the staple removal member is secured to the housing. Another end of the staple removal member faces the bottom of the conveyor section. The another end of the staple removal member is located above the second end of the first paper press member.

In an embodiment, the housing is provided with a first staple removal portion located above the staple removal member and on a side of the first paper inlet facing the placement section. The first staple removal portion is a stepped structure.

Moreover/alternatively, the housing is provided with a second staple removal portion located on a side of the first paper inlet facing away from the placement section. The second staple removal portion is a stepped structure.

In an embodiment, the paper feed assembly includes a first paper feed roller and a second paper feed roller. The first paper feed roller and the second paper feed roller are opposite to and separate from each other on two sides of the first paper inlet.

In an embodiment, the housing includes a base and a cover. The cover is configured to cover the base. The placement chamber is formed between the cover and the base. The cover at the conveyor section is connected to a paper press plate by a second elastic member.

Preferably, the paper holding mechanism includes a second paper press member. One end of the second paper press member is rotatably disposed on the housing. Another end of the second paper press member is configured to move towards or away from the first paper press member.

In another aspect, the present disclosure provides a paper shredder. The paper shredder includes a paper shredder core and the paper holding mechanism in any of the preceding solutions. The paper shredder core is disposed on the housing and is located below the first paper inlet.

REFERENCE LIST

Figure 1:
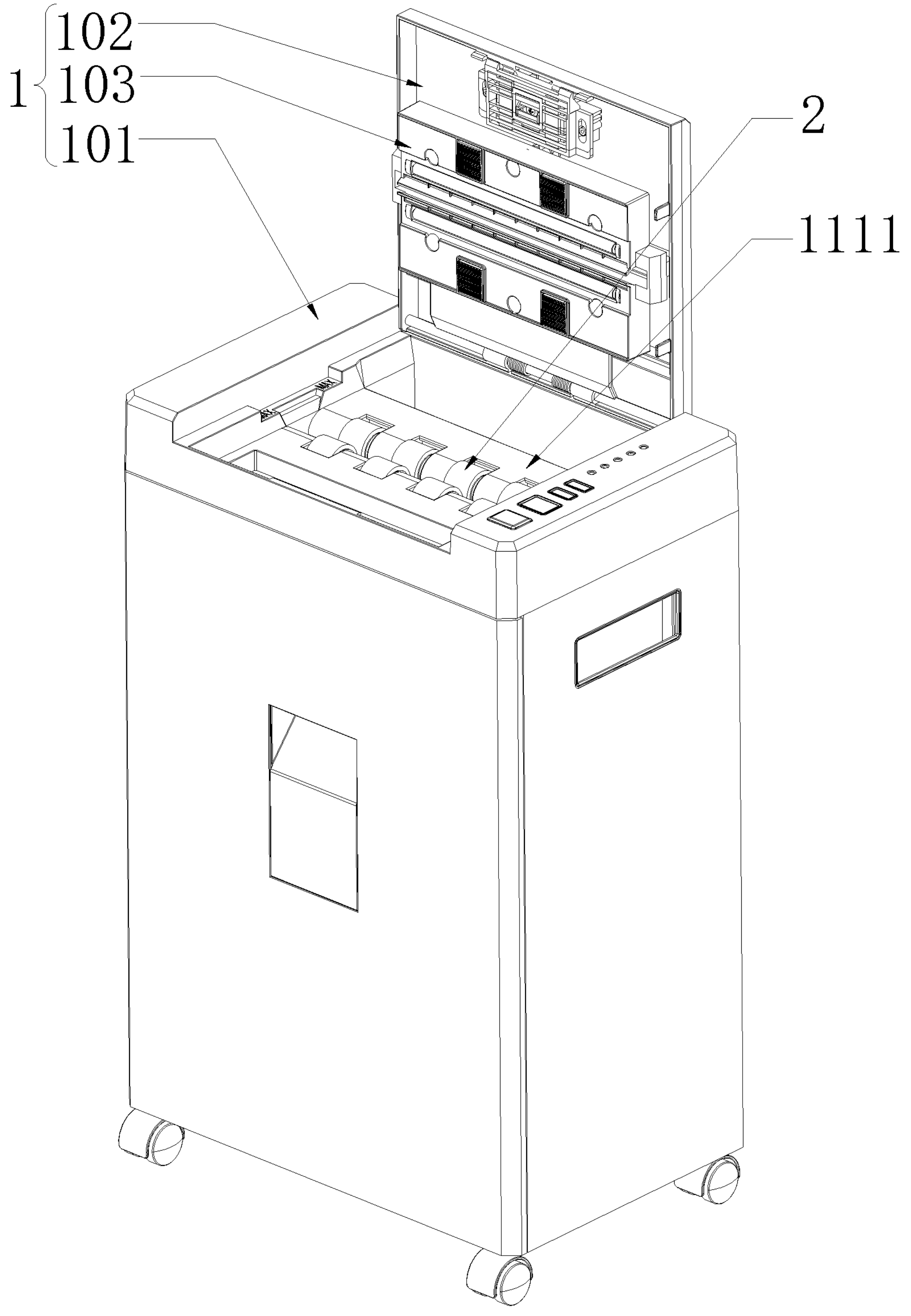
FIG. 1 is a view illustrating the structure of a paper shredder with a cover opened according to an embodiment of the present disclosure.
Figure 2:
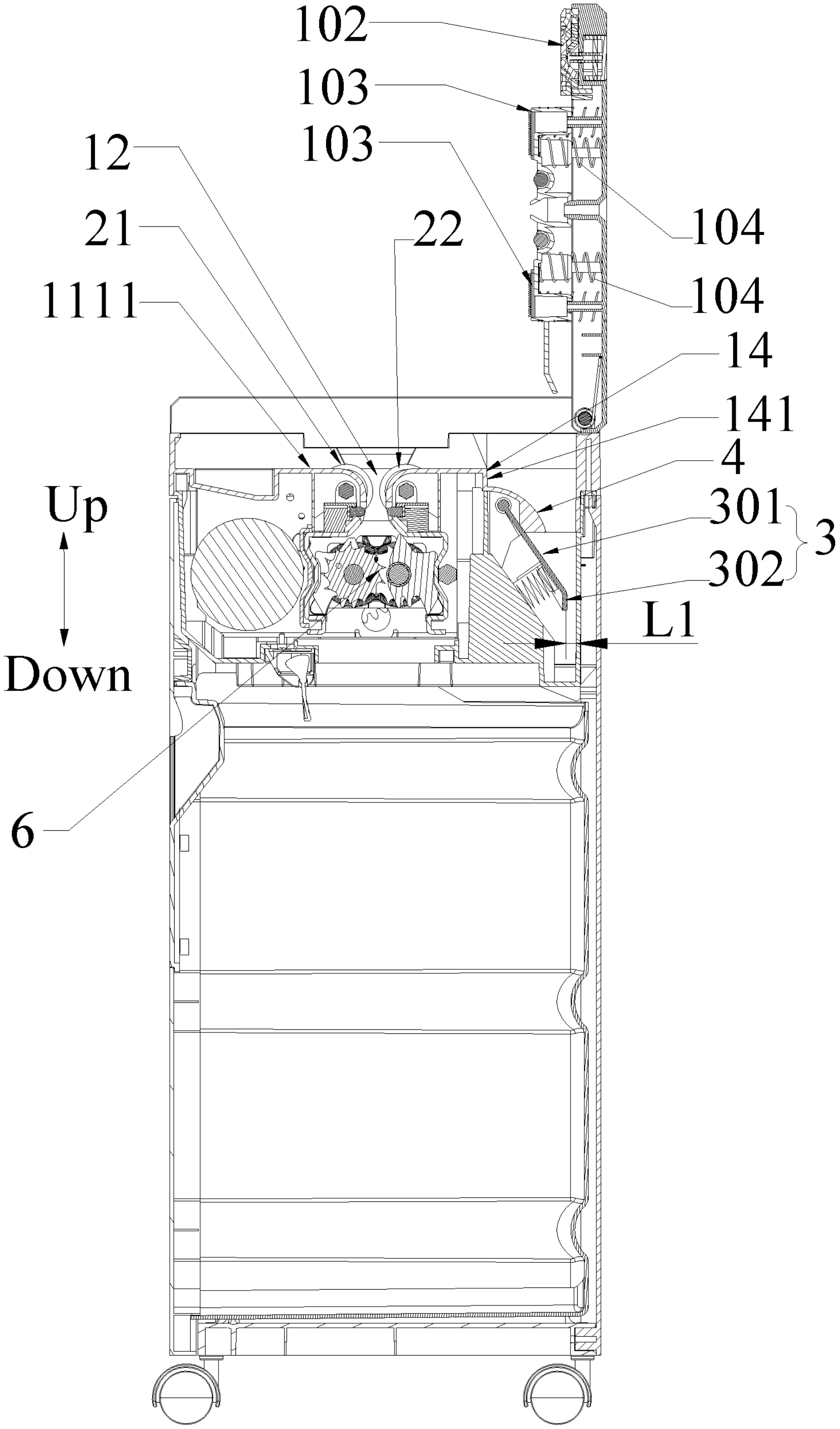
FIG. 2 is view taken at a first angle to illustrate the inner structure of a paper shredder with a cover opened according to an embodiment of the present disclosure.
Figure 3:
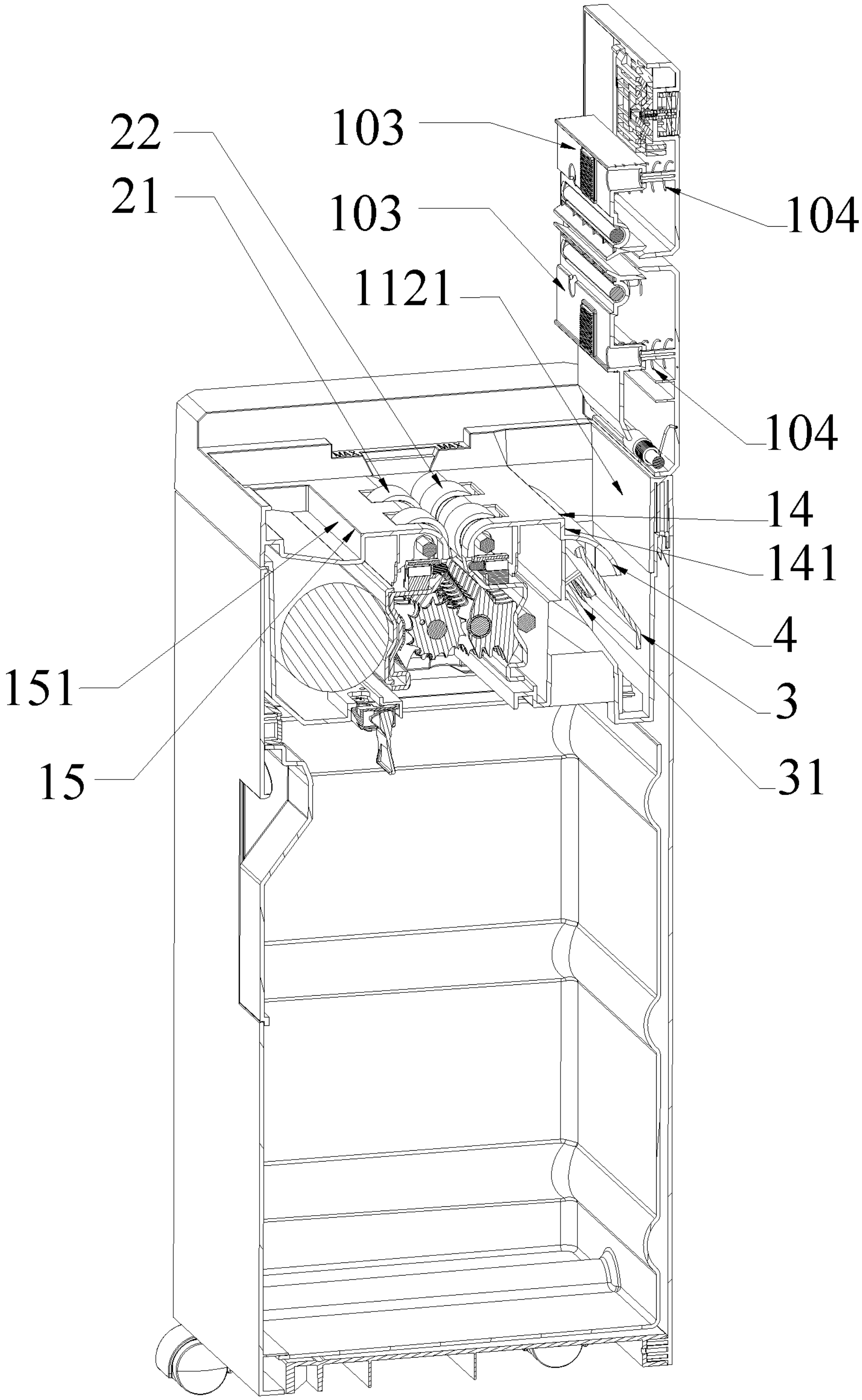
FIG. 3 is view taken at a second angle to illustrate the inner structure of a paper shredder with a cover opened according to an embodiment of the present disclosure.
Figure 4:
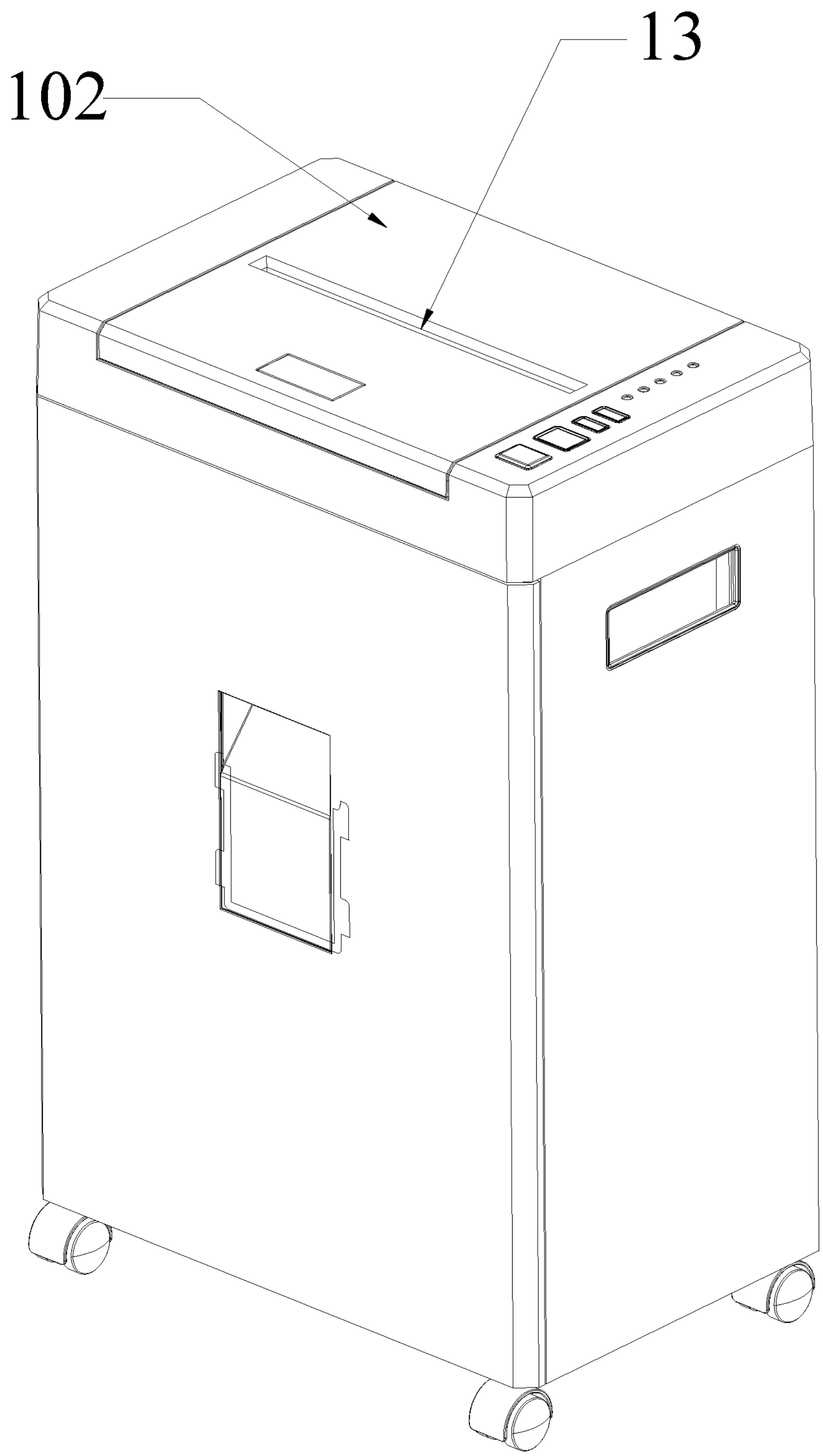
FIG. 4 is a view illustrating the structure of a paper shredder with a cover closed according to an embodiment of the present disclosure.
Figure 5:
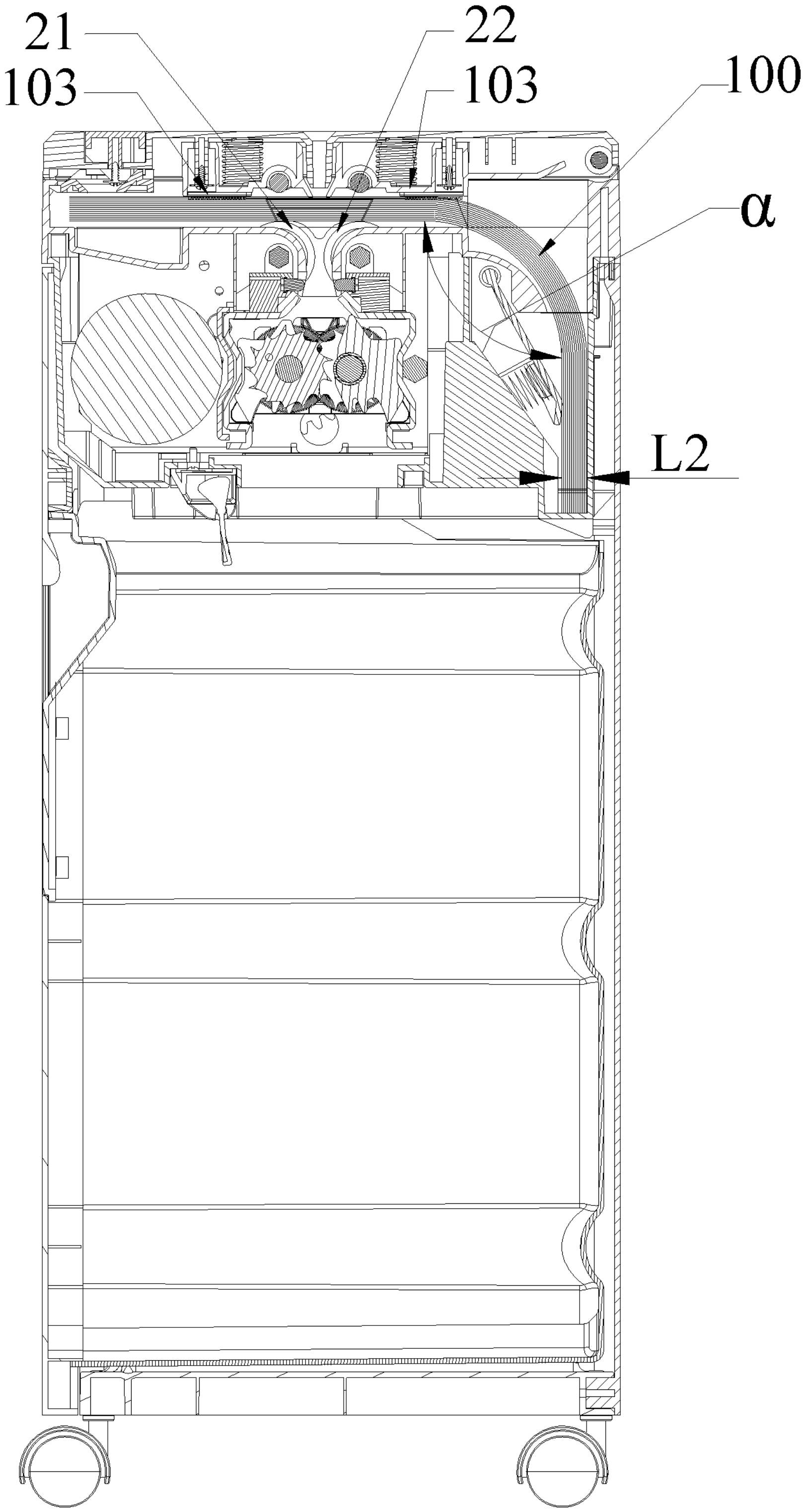
FIG. 5 is view taken at a first angle to illustrate the inner structure of a paper shredder with a cover closed according to an embodiment of the present disclosure.
Figure 6:
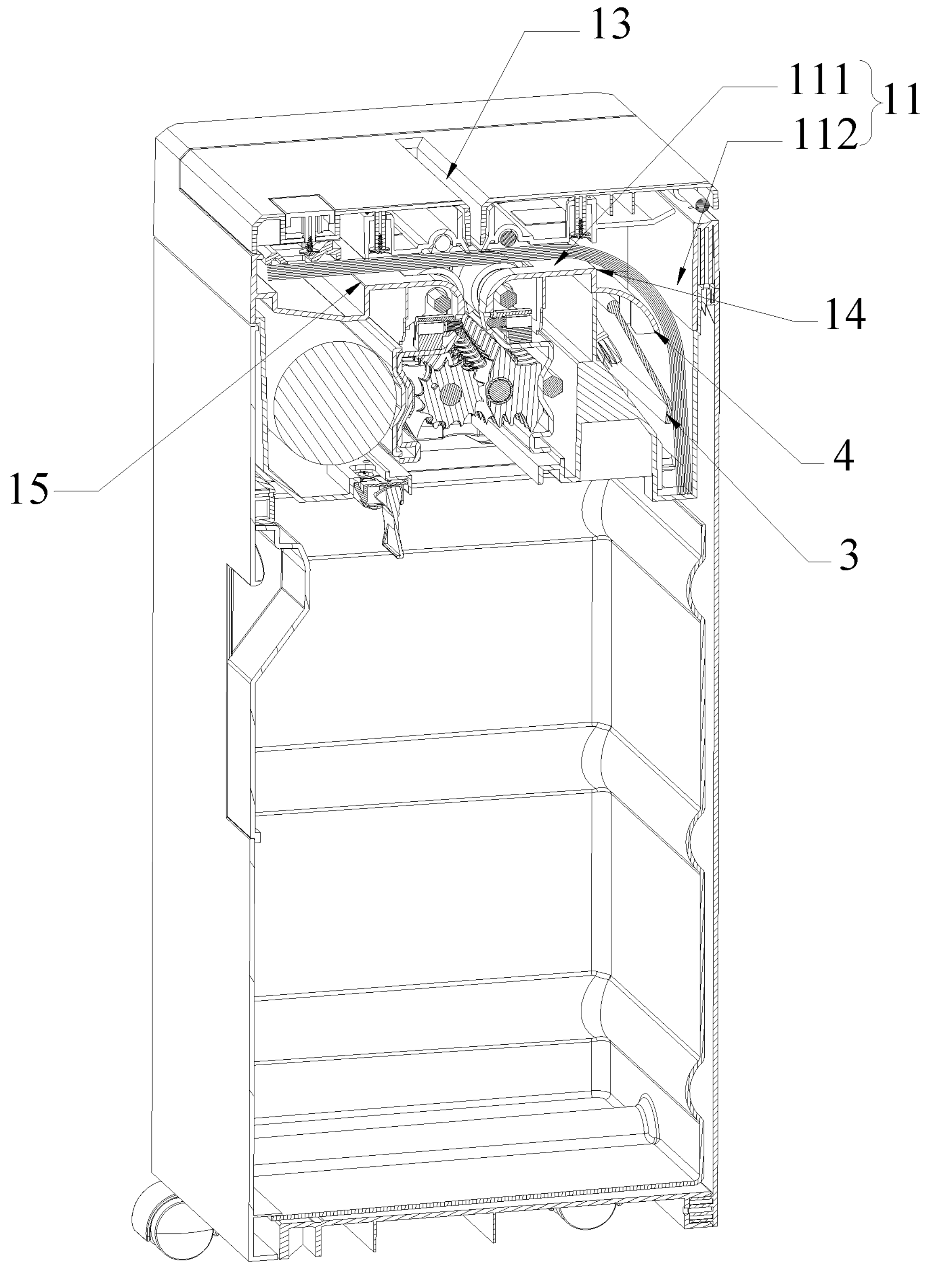
FIG. 6 is view taken at a second angle to illustrate the inner structure of a paper shredder with a cover closed according to an embodiment of the present disclosure.
Figure 7:
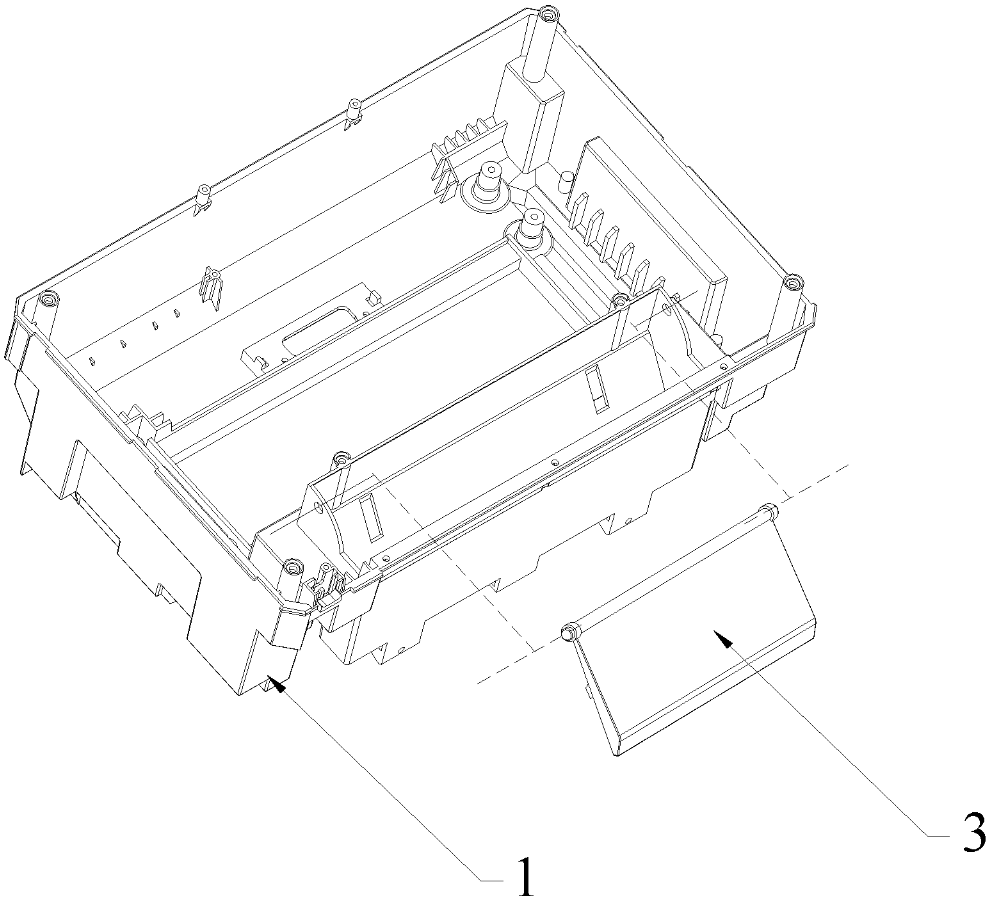
FIG. 7 is a view illustrating the structure of a housing and a first paper press member according to an embodiment of the present disclosure.
Figure 8:
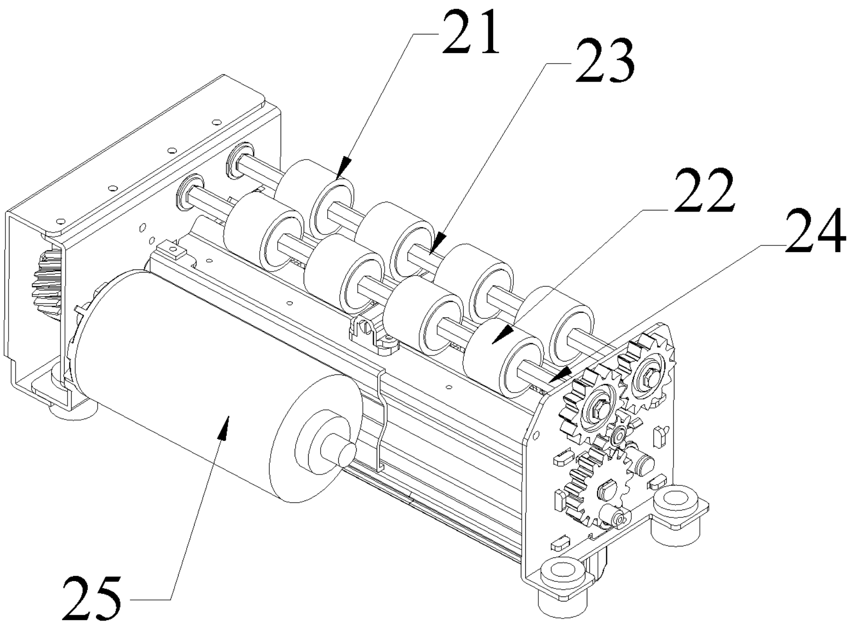
FIG. 8 is a view illustrating the structure of a paper feed assembly according to an embodiment of the present disclosure.

100 paper
1 housing
101 base
102 cover
103 paper press plate
104 second elastic member
11 placement chamber
111 conveyor section
1111 paper placement platform
112 placement section
1121 first side wall
12 first paper inlet
13 second paper inlet
14 first staple removal portion
141 first staple removal surface
15 second staple removal portion
151 second staple removal surface
2 paper feed assembly
21 first paper feed roller
22 second paper feed roller
23 first shaft
24 second shaft
25 power member
3 first paper press member
31 first elastic member
301 connection plate
302 staple removal plate
4 staple removal member
5 second paper press member
51 third elastic member
6 paper shredder core

DETAILED DESCRIPTION

The technical solutions of the present disclosure are described clearly and completely hereinafter in conjunction with drawings. Apparently, the described embodiments are part, not all, of embodiments of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is "under", "below", or "underneath" the second feature, the first feature is right under, below, or underneath the second feature, or the first feature is obliquely under, below, or underneath the second feature, or the first feature is simply at a lower level than the second feature.

In the description of the present disclosure, it is to be noted that unless otherwise expressly specified and limited, the term "mounted", "connected to each other", or "connected" should be construed in a broad sense as securely connected, detachably connected, or integrally connected; mechanically connected or electrically connected; directly connected to each other or indirectly connected to each other via an intermediary; or interconnected between two components. For those of ordinary skill in the art, specific meanings of the preceding terms in the present disclosure may be construed based on specific situations.

The embodiments of the present disclosure are described in detail below, and examples of the embodiments are illustrated in the drawings, where the same or similar reference numerals indicate the same or similar elements or elements having the same or similar functions. The embodiments described below with reference to the drawings are merely exemplary and intended to explain the present disclosure, and are not to be construed as limiting the present disclosure.

Embodiment One

As shown in FIGS. 1 to 8, this embodiment provides a paper holding mechanism. The paper holding mechanism includes a housing 1, a paper feed assembly 2, and a first paper press member 3. A placement chamber 11 is disposed in the housing 1. The placement chamber 11 includes a conveyor section 111 and a placement section 112 that communicate with each other. An included angle is set between the conveyor section 111 and the placement section 112. The housing 1 is provided with a first paper inlet 12 at the conveyor section 111. The first paper inlet 12 communicates with the conveyor section 111. The paper feed assembly 2 is disposed on the housing 1 and is located one side of the first paper inlet 12. The first paper press member 3 is disposed on the housing 1. The first paper press member 3 is disposed on the housing 1, and the width of the placement section 112 at the first paper press member 3 is variable. Specifically, the first paper press member 3 is movable between a first position and a second position. The distance between the first paper press member 3 and a first side wall 1121 of the placement section 112 facing away from the first paper inlet 12 is L1 when the first paper press member 3 is located at the first position and is L2 when the first paper press member 3 is located at the second position, where L2>L1. The bottom surface of the conveyor section 111 is a paper placement platform 1111. The first paper inlet 12 is opened on the paper placement platform 1111. L1 is greater than or equal to 1 mm. The value is such that a small amount of paper can be placed when the first paper press member 3 is at the first position.

The paper holding mechanism is provided with a conveyor section 111 and a placement section 112 between which an included angle is set so that the paper 100 can be bent, thereby effectively reducing the occupied area of the paper holding mechanism. In addition, the first paper press member 3 is provided so that the stacked paper 100 is sandwiched between the first side wall 1121 and the first paper press member 3. With such configuration, when the paper 100 is dragged into the first paper inlet 12 by the paper feed assembly 2, one end of the paper 100 with a staple is bent and stopped by the first paper press member 3. At this time, under the further driving of the paper feed assembly 2, the paper 100 of the lowermost layer is separated from the staple and is separately dragged to the first paper inlet 12. In this manner, the staple is prevented from entering the shredder core 6, and the service life of the shredder core 6 is prolonged.

The width of the placement section 112 at the first paper press member 3 is variable and may vary with the thickness of the paper 100, thereby ensuring that the paper 100 is always pressed against and abuts against the first paper press member 3. It is also ensured that first paper press member 3 has a stopping effect at all times.

The first paper press member 3 is plate-shaped. A first end of the first paper press member 3 is rotatably disposed on the housing 1. A second end of the first paper press member 3 is configured to move towards or away from the first side wall 1121. The minimum distance between the second end of the first paper press member 3 and the first side wall 1121 is L1. The minimum value of L1 is 1 mm.

In this embodiment, the first paper press member 3 includes a connection plate 301 and a staple removal plate 302 that are connected to each other. An included angle is set between the connection plate 301 and the staple removal plate 302. The connection plate 301 is rotatably connected to the housing 1. The staple removal plate 302 faces towards the bottom of the placement section 112. The minimum distance between the staple removal plate 302 and the first side wall 1121 is L1. In an embodiment, when the distance between the staple removal plate 302 and the first side wall 1121 is a minimum, that is, when the first paper press member 3 is at the first position, the staple removal plate 302 faces vertically downwards. This configuration allows the area of the staple removal plate 302 in contact with the paper 100 to be as large as possible, avoiding the paper 100 from being pulled apart during dragging. In this manner, the paper 100 is torn at the staple so as to be separated from the staple as much as possible. In addition, the preceding structure increases the strength of the first paper press member 3.

Regarding the driving method of the first paper press member 3, optionally, the paper holding mechanism in this embodiment includes a first elastic member 31 disposed between the first paper press member 3 and the housing 1. The first elastic member 31 is configured to make the second end of the first paper press member 3 move towards the first side wall 1121. In an embodiment, the first elastic member 31 is a compression spring. One end of the compression spring abuts against the housing 1. The other end of the compression spring abuts against the first paper press member 3. In another embodiment, the first elastic member 31 may be a torsion spring. One end of the torsion spring abuts against the housing 1. The other end of the torsion spring abuts against the staple removal member. The housing 1 is provided with two rotation holes. Two ends of the first paper press member 3 are each provided with one rotation pin. The two rotating pins are rotatably engaged with the two rotating holes one to one.

In other embodiments, the first paper press member 3 may be slidably disposed on the housing 1. Specifically, the housing 1 is provided with a sliding slot in which the first paper press member 3 is slidably disposed. In an embodiment, the sliding slot is arranged obliquely and slopes downwards in a direction away from the conveyor section 111. In this embodiment, an elastic member may be configured to apply an elastic force to the first paper press member 3 so that the first paper press member 3 moves towards the first side wall 1121. Further, one end of the first paper press member 3 close to the first side wall 1121 is provided with a downwards-bent staple stopper. With such configuration, after the bent paper 100 is in contact with the staple stopper, the first paper press member 3 abuts and is pressed against the upper side wall of the sliding slot, and the generated frictional force prevents the first paper press member 3 from retracting, that is, the generated friction force prevents the first paper press member 3 from moving away from the first side wall 1121.

To improve the success rate of staple removal, the paper holding mechanism in this embodiment includes a staple removal member 4. One end of the staple removal member 4 is secured to the housing 1. Another end of the staple removal member 4 faces the bottom of the placement section 112. The another end of the staple removal member 4 is located above the staple removal plate 302. The staple removal member 4 is located in the placement section 112. The staple removal member 4 and the housing 1 are integrally formed. In this embodiment, the staple removal member 4 has an arc-shaped plate-like structure, and bends downwards in a direction away from the first paper inlet 12. The tangent at the another end of the staple removal member 4 extends in a vertical direction.

To further improve the success rate of staple removal, the housing 1 is provided with a first staple removal portion 14 located above the staple removal member 4 and on the side of the first paper inlet 11 facing the placement section 12. The first staple removal portion 14 is a stepped structure that is used to stop a staple lower than the paper 100. The first staple removal portion 14 includes a first staple removal surface 141 that is perpendicular to the bottom surface of the conveyor section 111, that is, the first staple removal surface 141 is perpendicular to the paper placement platform 1111. When the paper 100 passes the first staple removal surface 141, the staple is stopped by the first staple removal surface 141. Of course, in other embodiments, the first staple removal surface 141 may be obliquely arranged such that the first staple removal surface 141 gets closer to the first paper inlet 12 from top to bottom. The three-stage staple removal mechanism greatly improves the reliability of staple removal.

In this embodiment, the included angle between the conveyor section 111 and the placement section 112 is α, where 70°≥α≥135°. In an embodiment, α=90°.

Optionally, the housing 1 is provided with a second staple removal portion 15 located on the side of the first paper inlet

12 facing away from the placement section 112. The second staple removal portion 15 is a stepped structure and is located in the conveyor section 111. The second staple removal portion 15 includes a second staple removal surface 151 that is perpendicular to the bottom surface of the conveyor section 111, that is, the second staple removal surface 151 is perpendicular to the paper placement platform 1111. When the paper 100 passes the second staple removal surface 151, the staple is stopped by the second staple removal surface 151. Of course, in other embodiments, the second staple removal surface 151 may be obliquely arranged such that the second staple removal surface 151 gets closer to the first paper inlet 12 from top to bottom.

Regarding the structure of the paper feed assembly 2, the paper feed assembly 2 in this embodiment includes a first paper feed roller 21 and a second paper feed roller 22. The first paper feed roller 21 and the second paper feed roller 22 are opposite to and separate from each other on two sides of the first paper inlet 12. This configuration enables the paper 100 on two sides of the first paper inlet 12 to be dragged into the first paper inlet 12, thereby improving the shredding efficiency of the paper 100. Each of the first paper feed roller 21 and the second paper feed roller 22 is a rubber wheel.

Several first paper feed rollers 21 and second paper feed rollers 22 are provided and are opposite to each other in a one-to-one manner. Specifically, four first paper feed rollers 21 and four second paper feed rollers 22 are provided. A first shaft 23 and a second shaft 24 are opposite to each other and connected by a gear transmission. The first paper feed rollers 21 are fixed to the first shaft 23. The second paper feed rollers 22 are fixed to the second shaft 24. The first shaft 23 is connected to the power member 25 by the gear transmission.

The housing 1 includes a base 101 and a cover 102. The cover 102 is configured to cover the base 101. The placement chamber 11 is formed between the cover 102 and the base 101. The cover 102 at the conveyor section 111 is connected to a paper press plate 103 by a second elastic member 104. This configuration allows the paper 100 to be pressed at all times, facilitating the dragging of the paper feed assembly 2.

Optionally, the cover 102 is provided with a second paper inlet 13 located directly above the first paper inlet 12. The paper 100 can pass through the second paper inlet 13. This configuration makes it possible to manually feed the paper downwards. The paper 100 enters the shredder core 6 through the second paper inlet 13 and the first paper inlet 12. In this embodiment, two paper press plates 103 are provided and are separated on two sides of the second paper inlet 13.

Embodiment Two

Figure 9:
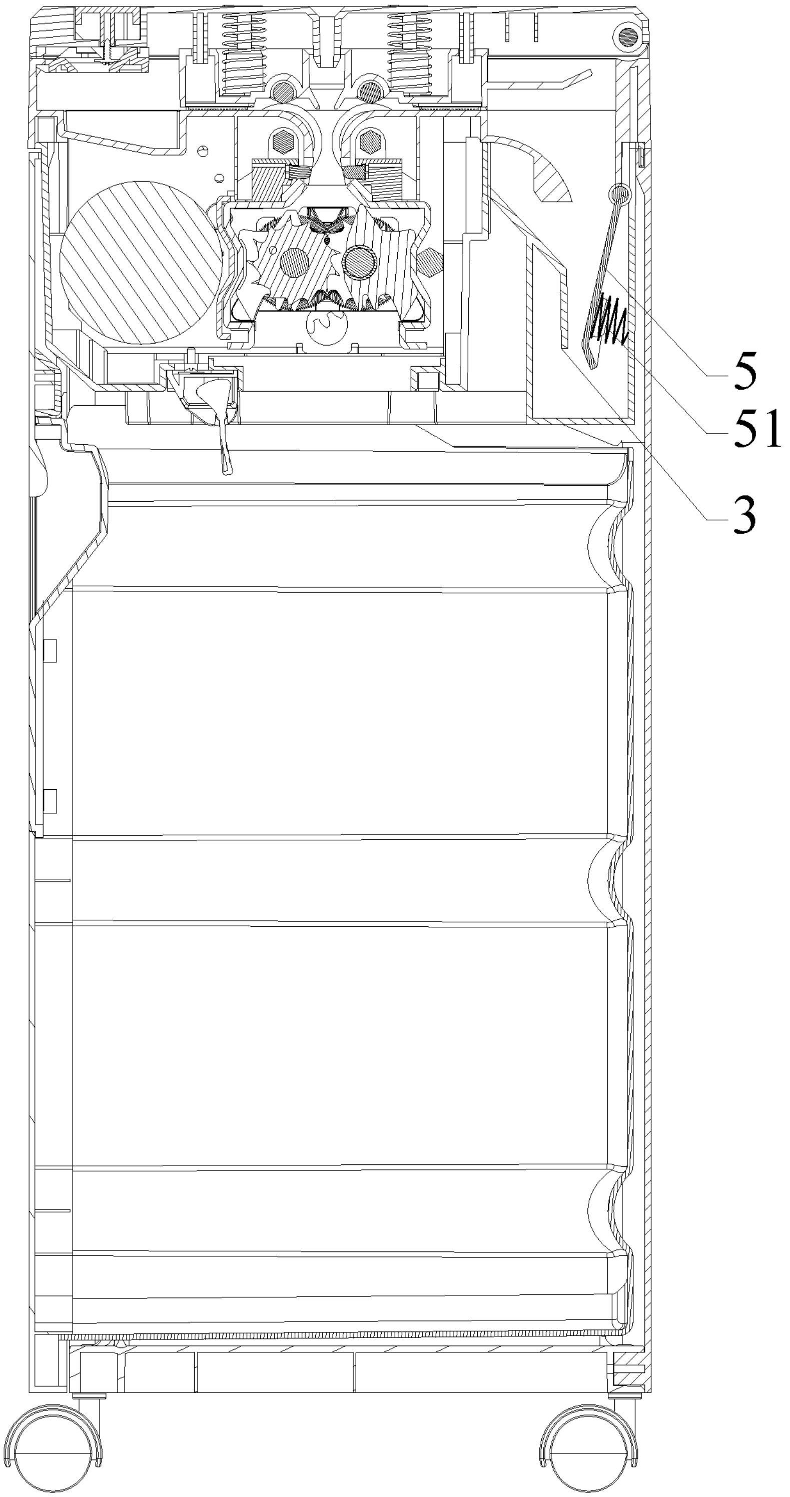
FIG. 9 is a view illustrating the inner structure of a paper shredder including a second paper press member and with a cover closed according to an embodiment of the present disclosure.
Figure 10:
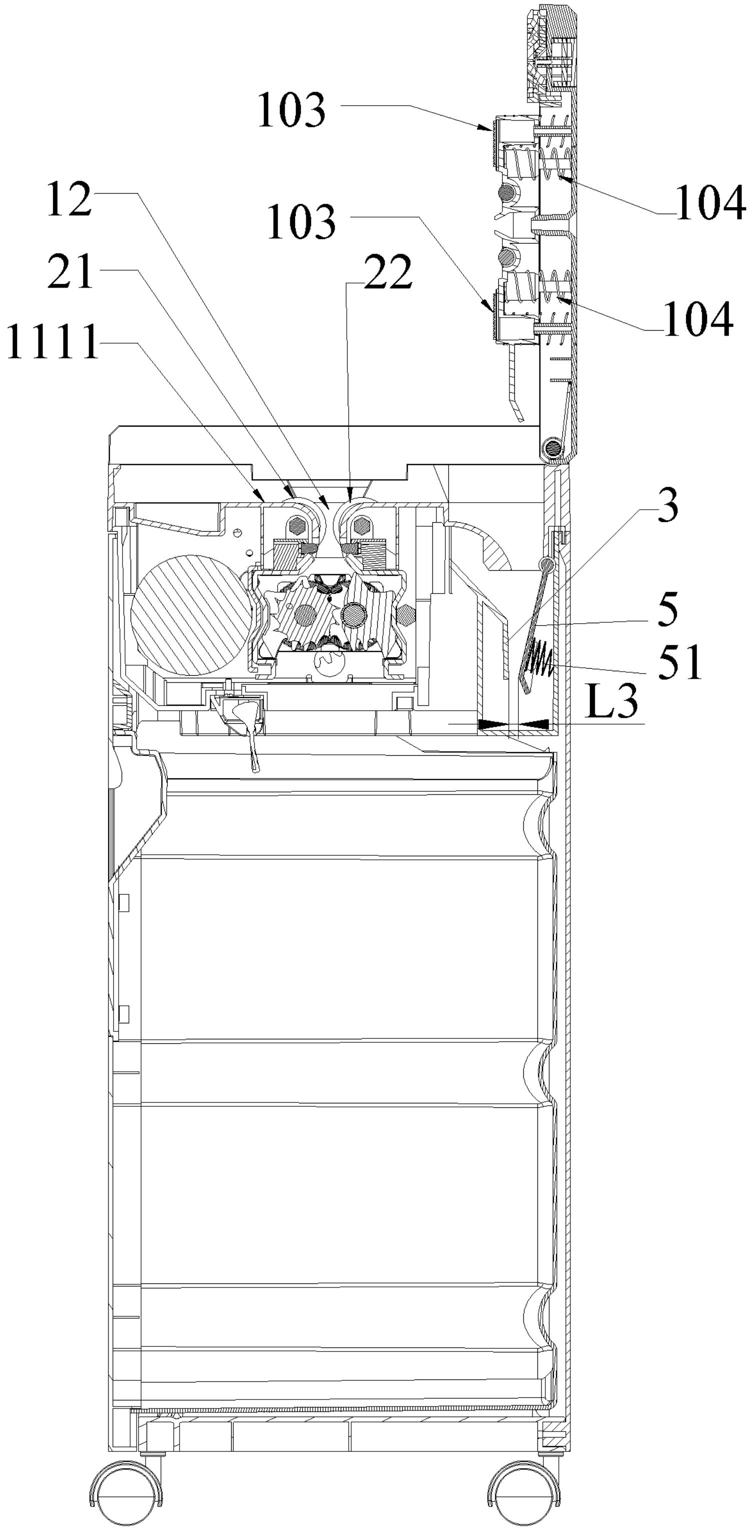
FIG. 10 is a view illustrating the inner structure of a paper shredder including a second paper press member and with a cover opened according to an embodiment of the present disclosure.

As shown in FIGS. 9 and 10, this embodiment provides a paper holding mechanism whose structure is basically the same as that of embodiment one except that the paper holding mechanism includes a second paper press member 5. One end of the second paper press member 5 is rotatably disposed on the housing 1. Another end of the second paper press member 5 is configured to move towards or away from the first paper press member 3. Specifically, the another end of the second paper press member 5 is movable between a third position and a fourth position. The distance between first paper press member 3 and the another end of the second paper press member 5 is L3 when the another end of the second paper press member 5 is located at the third position and the distance between first paper press member 3 and the another end of the second paper press member 5 when the another end of the second paper press member 5 is located at the fourth position is greater than L3. L3 is greater than 1 mm to facilitate placement of a small amount of paper. The third elastic member 51 is provided between the second paper press member 5 and the housing 1 to make the another end of the second paper press member 5 move towards the first paper press member 3, that is, to make the another end of the second paper press member 5 stop at the third position. In an embodiment, one end of the second paper press member 5 is rotatably disposed on the housing 1. The another end of the second paper press member 5 is provided with a flange structure. When the another end of the second paper press member 5 is located at the third position, the flange is vertically downwards so as to maximize the contact area with the paper. In addition, the flange can increase the strength of the second paper press member 5.

Embodiment Three

This embodiment provides a paper shredder. The paper shredder includes a paper shredder core 6 and the paper holding mechanism in the preceding solutions. The paper shredder core 6 is disposed on the housing 1 and is located below the first paper inlet 12.

Apparently, the preceding embodiments of the present disclosure are only illustrative of the present disclosure and are not intended to limit the implementations of the present disclosure. For those of ordinary skill in the art, changes or alterations in other different forms may also be made based on the above description. All implementations cannot be and do not need to be exhausted herein.

What is claimed is:

1. A paper holding mechanism, comprising:

a housing, wherein a placement chamber is disposed in the housing, the placement chamber comprises a conveyor section and a placement section that communicate with each other, an included angle is set between the conveyor section and the placement section, the housing is provided with a first paper inlet at the conveyor section, and the first paper inlet communicates with the conveyor section;

a paper feed assembly disposed on the housing; and a first paper press member disposed on the housing, wherein a width of the placement section at the first paper press member is variable;

wherein the first paper press member is disposed on the housing and is movable between a first position and a second position, and a distance between the first paper press member and a first side wall of the placement section facing away from the first paper inlet is L1 when the first paper press member is located at the first position and is L2 when the first paper press member is located at the second position, wherein L2>L1.

2. The paper holding mechanism according to claim 1, wherein the first paper press member is plate-shaped, a first end of the first paper press member is rotatably disposed on the housing, a second end of the first paper press member is configured to move towards or away from the first side wall, and a minimum distance between the second end of the first paper press member and the first side wall is L1.

3. The paper holding mechanism according to claim 2, comprising a first elastic member disposed between the first paper press member and the housing, wherein the first elastic member is configured to make the second end of the first paper press member move towards the first side wall.

4. The paper holding mechanism according to claim 3, wherein the paper feed assembly comprises a first paper feed roller and a second paper feed roller, wherein the first paper feed roller and the second paper feed roller are opposite to and separate from each other on two sides of the first paper inlet.

5. The paper holding mechanism according to claim 2, comprising a staple removal member, wherein one end of the staple removal member is secured to the housing, another end of the staple removal member faces a bottom of the conveyor section, and the another end of the staple removal member is located above the second end of the first paper press member.

6. The paper holding mechanism according to claim 5, wherein the housing is provided with a first staple removal portion located above the staple removal member and on a side of the first paper inlet facing the placement section, and the first staple removal portion is a stepped structure.

7. The paper holding mechanism according to claim 6, wherein the paper feed assembly comprises a first paper feed roller and a second paper feed roller, wherein the first paper feed roller and the second paper feed roller are opposite to and separate from each other on two sides of the first paper inlet.

8. The paper holding mechanism according to claim 5, wherein the housing is provided with a first staple removal portion located above the staple removal member and on a side of the first paper inlet facing the placement section, and the first staple removal portion is a stepped structure; and the housing is provided with a second staple removal portion located on a side of the first paper inlet facing away from the placement section, and the second staple removal portion is a stepped structure.

9. The paper holding mechanism according to claim 8, wherein the paper feed assembly comprises a first paper feed roller and a second paper feed roller, wherein the first paper feed roller and the second paper feed roller are opposite to and separate from each other on two sides of the first paper inlet.

10. The paper holding mechanism according to claim 5, wherein the housing is provided with a second staple removal portion located on a side of the first paper inlet facing away from the placement section, and the second staple removal portion is a stepped structure.

11. The paper holding mechanism according to claim 10, wherein the paper feed assembly comprises a first paper feed roller and a second paper feed roller, wherein the first paper feed roller and the second paper feed roller are opposite to and separate from each other on two sides of the first paper inlet.

12. The paper holding mechanism according to claim 5, wherein the paper feed assembly comprises a first paper feed roller and a second paper feed roller, wherein the first paper feed roller and the second paper feed roller are opposite to and separate from each other on two sides of the first paper inlet.

13. The paper holding mechanism according to claim 2, further comprising a paper press plate, wherein the housing comprises a base and a cover, wherein the cover is configured to cover the base, the placement chamber is formed between the cover and the base, and the cover at the conveyor section is connected to the paper press plate by a second elastic member.

14. The paper holding mechanism according to claim 2, wherein the paper feed assembly comprises a first paper feed roller and a second paper feed roller, wherein the first paper feed roller and the second paper feed roller are opposite to and separate from each other on two sides of the first paper inlet.

15. The paper holding mechanism according to claim 1, wherein the paper feed assembly comprises a first paper feed roller and a second paper feed roller, wherein the first paper feed roller and the second paper feed roller are opposite to and separate from each other on two sides of the first paper inlet.

16. The paper holding mechanism according to claim 1, further comprising a paper press plate, wherein the housing comprises a base and a cover, wherein the cover is configured to cover the base, the placement chamber is formed between the cover and the base, and the cover at the conveyor section is connected to the paper press plate by a second elastic member.

17. The paper holding mechanism according to claim 1, comprising a second paper press member, wherein one end of the second paper press member is rotatably disposed on the housing, and another end of the second paper press member is configured to move towards or away from the first paper press member.

18. A paper shredder, comprising a paper shredder core and the paper holding mechanism according to claim 1, wherein the paper shredder core is disposed on the housing and is located below the first paper inlet.

* * * * *